United States Patent [19]

Mallikarjun

[11] Patent Number: 5,034,449
[45] Date of Patent: Jul. 23, 1991

[54] MOLDABLE POLYBLENDS OF POLYOLEFINS AND STYRENIC RESINS

[75] Inventor: Ramesh Mallikarjun, West Chester, Pa.

[73] Assignee: Arco Chemical Technology, Inc., Wilmington, Del.

[21] Appl. No.: 405,254

[22] Filed: Sep. 11, 1989

[51] Int. Cl.$^5$ .................. C08L 23/10; C08L 51/04
[52] U.S. Cl. ........................... 524/504; 525/71; 525/74; 525/89; 525/93
[58] Field of Search .............. 525/71, 74, 89, 93; 524/504

[56] References Cited

U.S. PATENT DOCUMENTS

| | | | |
|---|---|---|---|
| 4,097,551 | 6/1978 | Digiulio | 525/71 |
| 4,147,739 | 4/1979 | Lee | 525/71 |
| 4,386,187 | 5/1983 | Gramcie et al. | 525/96 |
| 4,386,188 | 5/1983 | Gramcie et al. | 525/96 |
| 4,582,871 | 4/1986 | Noro et al. | 524/413 |

FOREIGN PATENT DOCUMENTS 63-205341 8/1988 Japan.

OTHER PUBLICATIONS

Bartlett et al [Mod. Plastics 60 (Dec. 1981)].

Primary Examiner—John C. Bleutge
Assistant Examiner—David Buttner
Attorney, Agent, or Firm—Stephen D. Harper

[57] ABSTRACT

A polyblend composition containing an olefin polymer, a rubber-modified styrenic resin, and a block copolymer compatibilizer is disclosed. In a preferred embodiment, a crystalline propylene polymer, a styrene/maleic anhydride random thermoplastic copolymer modified with a grafted styrene/butadiene rubber, and a hydrogenated styrene/butadiene block copolymer are intimately mixed to form a useful thermoplastic polyblend.

17 Claims, No Drawings

MOLDABLE POLYBLENDS OF POLYOLEFINS AND STYRENIC RESINS

FIELD OF THE INVENTION

This invention relates to polyblend compositions useful as engineering resins for the preparation of molded articles. More particularly, this invention pertains to thermoplastic polyblend compositions having improved impact properties.

SUMMARY OF THE INVENTION

A moldable polyblend composition comprised of an olefin polymer, a rubber-modified styrenic resin, and a compatibilizer is provided by this invention. The invention also provides filled thermoplastic compositions comprised of the polyblend composition and a filler.

At least about 50 weight percent of the olefin polymer is a crystalline propylene polymer. The olefin polymer comprises from about 40 to 80 weight percent of the polyblend.

The rubber-modified styrenic resin, which comprises from about 5 to 40 weight percent of the polyblend, is comprised of from about 65 to 95 weight percent of a random thermoplastic copolymer and from about 5 to 35 weight percent of a grafted rubber selected from the group consisting of ethylene propylene diene monomer (EPDM) rubbers and conjugated diene rubbers. The random thermoplastic copolymer contains from about 35 to 99 weight percent of a vinyl aromatic monomer, from about 1 to 30 weight percent of an $\alpha,\beta$-unsaturated dicarboxylic acid derivative, and from 0 to about 35 weight percent of an ethylenically unsaturated monomer selected from the group consisting of unsaturated nitriles, $\alpha,\beta$-unsaturated monocarboxylic acids, $C_1$-$C_4$ alkyl esters of $\alpha,\beta$-unsaturated monocarboxylic acids, and mixtures thereof. In a preferred embodiment, the random thermoplastic copolymer is a styrene/maleic anhydride copolymer.

The compatibilizer comprises from about 3 to 40 weight percent of the polyblend and may be selected from the group consisting of mono-vinyl aromatic monomer/conjugated diene block copolymers, hydrogenated mono-vinyl aromatic monomer/conjugated diene block copolymers, and mixtures thereof.

The polyblends of this invention have remarkably improved impact properties as compared to prior art polyblends of olefin polymers and styrenic copolymers in which the copolymer was not modified with a grafted rubber. The magnitude of improvement in impact properties was unexpected in view of the relatively minor enhancement in such properties obtainable by simple blending of ungrafted rubber into the polyblends. The substantially reduced brittleness of the polyblends of this invention is also surprising in that the grafted rubber of the styrenic resin copolymer component constitutes only a small portion of the overall polyblend composition.

Also unforeseen was the minimal effect of using a rubber-modified styrenic resin on the other physical properties of the polyblend composition. Tensile and flexural strength are not compromised while only insignificant changes in flexural modulus (stiffness) and heat resistance are observed. Normally, major improvements in the impact properties of a thermoplastic resin are accompanied by substantial degradation of certain other properties of the resin.

DETAILED DESCRIPTION OF THE INVENTION

A. Olefin Polymer

The moldable polyblend compositions of this invention can include from about 40 to 80 weight percent, preferably from about 45 to 80 weight percent, of an olefin polymer. At least about 50 weight percent (more preferably, at least about 60 weight percent) of the olefin polymer is a crystalline propylene polymer. The crystalline propylene polymer may be either a homopolymer of propylene or a copolymer of propylene with a minor amount (preferably, from about 1 to 20 weight percent) of another olefin such as ethylene, 1-butene, 4-methyl-1-pentene, 1-hexene, 1-octene, and the like. The apparent crystalline melting point of the crystalline propylene polymer is preferably from about 140 to 180° C.; it is not necessary for this component to be completely crystalline (i.e., isotactic).

In addition to the crystalline propylene polymer, the olefin polymer component of the polyblend composition may include polymers and copolymers of other unsaturated monomers. Examples of such materials include, but are not limited to polyethylene (low or high density), poly(1-butene), poly(4-methyl-1-pentene), copolymers of 4-methyl-1-pentene with linear or branched $\alpha$-olefins, poly (3-methyl-1-butene), ethylene-propylene-diene polymers (EPDM polymers), copolymers of ethylene and 1-butene, copolymers of ethylene and vinyl acetate, copolymers of ethylene and ethyl acrylate, and the like and their mixtures.

Particularly useful olefin polymers include impact-modified polypropylenes, which are blends of a crystalline propylene polymer (homopolymer or copolymer) with an EPDM (ethylene propylene diene monomer) copolymer, an ethylene/propylene copolymer, and/or a high density polyethylene. The use of an impact-modified polypropylene having from about 60 to 92.5 weight percent crystalline propylene polymer, from about 5 to 27 weight percent EPDM, and from about 2.5 to 13 weight percent high density polyethylene is especially desirable. Mixtures of propylene homopolymers and ethylene/propylene random or block copolymers also may be employed to advantage in the present polyblends.

Methods of preparing the olefin polymers described above are well-known in the art. General descriptions of such methods may be found, for example, in "Propylene Polymers" *Encyclopedia of Polymer Science and Engineering* 2nd Ed., Wiley-Interscience, Vol. 13, pp. 464–530 (1988) and "Olefin Polymers" *Kirk-Othmer Encyclopedia of Chemical Technology* 3rd Ed., Wiley-Interscience, Vol. 16, pp. 385–479(1981). The teachings of these reviews are incorporated herein by reference.

Illustrative examples of suitable commercially available propylene polymers include Norchem ® NPP8006-GF (a general purpose propylene homopolymer sold by Quantum Chemical Corp.), Norchem ® NPP8752-HF (a high impact propylene copolymer sold by Quantum Chemical Corp.), Escorene ® 1052 (a general purpose propylene homopolymer sold by Exxon Chemical Co.), Huntsman ® 7525 (a high impact propylene copolymer sold by Huntsman Polypropylene Corp.), Pro-Fax ® SB786 (a medium impact propylene homopolymer sold by Himont U.S.A., Inc.), Unipol ® 7C56 (a high impact propylene copolymer sold by Shell Chemical Co.), Pro-Fax ® 6323 (a general purpose propylene homopolymer sold by Himont U.S.A., Inc.) and Rexene 17/57512A (a high impact propylene copolymer sold by Rexene Products Co.).

The number average molecular weight of the olefin polymer component of the polyblends of this invention is preferably above about 10,000 and more preferably is greater than about 50,000. The olefin polymer preferably has a melt flow rate of less than about 15 g/10 min. (Condition L). Olefin polymers having melt flow rates of less than about 12 g/10 min. are especially favored. Prior efforts to prepare polyblends of high molecular weight polypropylene (i.e., polypropylene with a melt flow rate of less than 15 g/10 min.) and non-rubber-modified styrene/maleic anhydride copolymers were unsuccessful due to problems with moldability and the appearance of the molded articles (Jpn. Pat. No. 63-205341). In contrast, moldings having excellent surface appearance and properties are readily obtained by conventional processing using the polyblends of this invention. Without wishing to be bound by theory, it is believed that the presence of the grafted rubber in the styrenic resin component is responsible for the greater compatibility and processability of the present polyblends as compared to the prior art polyblends. The ability to use high molecular weight olefin polymers in the polyblends of this invention is thought to make possible the observed improvements in impact properties. Melt strength is also expected to be improved by the use of higher molecular weight olefin polymers.

B. Rubber-Modified Styrene Resin

The moldable polyblend compositions of this invention additionally are comprised of from about 5 to 40 weight percent (more preferably, from about 10 to 30 weight percent) of a rubber-modified styrenic resin. The rubber-modified styrenic resin contains from about 65 to 95 weight percent (more preferably, from about 75 to 90 weight percent) of a random thermoplastic copolymer and from about 5 to 35 weight percent (more preferably, from about 10 to 25 weight percent) of a grafted rubber.

The random thermoplastic copolymer is comprised of from about 35 to 99 weight percent of a vinyl aromatic monomer, from about 1 to 30 weight percent of an $\alpha,\beta$-unsaturated dicarboxylic acid derivative, and from 0 to 35 weight percent of a third ethylenically unsaturated monomer. It is preferred that the random thermoplastic copolymer be comprised of from about 70 to 99 weight percent vinyl aromatic monomer and from about 1 to 30 weight percent $\alpha,\beta$-unsaturated dicarboxylic acid derivative. The weight ratio of vinyl aromatic to $\alpha,\beta$-unsaturated dicarboxylic acid derivative is more preferably from about 75:25 to 95:5.

Although any suitable vinyl aromatic monomer may be employed in the random thermoplastic copolymer, styrene is the preferred monomer because of its low cost and availability. Examples of other vinyl aromatic monomers which can be used include, but are not limited to, ar-methyl styrene, ar-ethyl styrene, ar-tertbutyl styrene, ar-chloro styrene, alpha-methyl styrene, divinyl benzene, vinyl benzyl chloride, and vinyl naphthalene, as well as other alkyl- or halo-substituted styrenes. Mixtures of vinyl aromatic monomers can be used.

The preferred $\alpha,\beta$-unsaturated dicarboxylic acid derivative is an $\alpha$-$\beta$-unsaturated dicarboxylic acid anhydride. Exemplary $\alpha,\beta$-unsaturated dicarboxylic acid anhydrides include itaconic anhydride, citraconic anhydride, ethyl maleic anhydride, methyl itaconic anhydride, chloromaleic anhydride, bromomaleic anhydride, tetrahydrophthalic anhydride, and, most preferably, maleic e. However, other $\alpha,\beta$-unsaturated dicarboxylic acid derivatives may also be employed including $\alpha,\beta$-unsaturated dicarboxylic acids such as maleic or fumaric acid and maleimides such as N-methyl maleimide, N-phenyl maleimide, N-tribromo-phenyl maleimide, and the like. If desired, mixtures of $\alpha,\beta$-unsaturated dicarboxylic acid derivatives can be used.

The third ethylenically unsaturated monomer may be selected from the group consisting of unsaturated nitriles such as acrylonitrile and methacrylonitrile, $\alpha,\beta$-unsaturated monocarboxylic acids such as acrylic acid and methacrylic acid, $C_1$-$C_4$ alkyl esters of $\alpha,\beta$-unsaturated mono-carboxylic acids such as methyl methacrylate and ethyl acrylate, and mixtures thereof. Terpolymers of styrene, maleic anhydride, and acrylonitrile or methyl methacrylate are particularly preferred.

In a preferred embodiment of this invention, the random thermoplastic copolymer is a styrene/maleic anhydride copolymer. The random thermoplastic copolymer preferably has a number average molecular weight of from about 30,000 to about 500,000 or a melt flow rate (Condition L) of from about 0.1 to 10 g/10 min.

The rubber-modified styrenic resin is additionally comprised of from about 5 to 35 weight percent (preferably, from about 10 to 25 weight percent) of a rubber grafted on the random thermoplastic copolymer. The grafted rubber is selected from the group consisting of conjugated diene rubbers and ethylene propylene diene monomer rubbers.

Conjugated diene rubbers suitable for use in this invention preferably contain at least about 50 weight percent of a conjugated diene and have glass transition temperatures less than about 0° C. (more preferably, less than about $-20°$ C.). Such rubbers include homopolymers, random copolymers, and block copolymers of conjugated 1,3-dienes such as 1,3-butadiene (a preferred diene), isoprene, chloroprene, 1,3-pentadiene, 2,3-dimethyl-1,3-butadiene, and the like. The conjugated diene rubber is preferably selected from the group consisting of mono-vinyl aromatic monomer/conjugated diene block copolymers, mono-vinyl aromatic monomer/conjugated diene random copolymers, conjugated diene homopolymers, and mixtures thereof.

The conjugated diene rubber may contain one or more copolymerizable ethylenically unsaturated monomers. Most preferably, the comonomer is a mono-vinyl aromatic monomer such as styrene, ar-methyl styrene, ar-ethyl styrene, ar-tert-butyl styrene, ar-chlorostyrene, alpha-methyl styrene, vinyl benzyl chloride, vinyl naphthalene, and the like and mixtures thereof. Other copolymerizable ethylenically unsaturated monomers may be employed, however, including unsaturated nitrile monomers such as acrylonitrile and methacrylonitrile, alkyl acrylates such as methyl methacrylate, methyl acrylate, butyl acrylate, or 2-ethylhexyl methacrylate, acrylamides such as acrylamide, methacrylamide, or butylacrylamide, unsaturated ketones such as vinyl methyl ketone or methyl isopropenyl ketone, $\alpha$-olefins such as ethylene or propylene, vinyl esters such as vinyl acetate or vinyl stearate, vinyl heterocyclic monomers such as vinyl pyridine, vinyl and vinylidene halides such as vinyl chloride or vinylidene chloride, and the like and mixtures thereof. In a preferred embodiment of this invention, the comonomer used in combination with the 1,3-conjugated diene is the same as the vinyl aromatic monomer component of the random thermoplastic copolymer of the rubber modified styrenic resin.

Exemplary conjugated diene rubbers suitable for grafting onto the random thermoplastic copolymer include styrene/butadiene and styrene/isoprene block copolymers. Such block copolymers may be linear, radial, or branched in structure. Linear block copolymers may have an ABA, AB(AB)$_n$A, (AB)$_n$, or similar structure wherein A represents a block of the mono-vinyl aromatic monomer, B represents a block of the conjugated diene and n is an integer of 1 to 10. Radial block copolymers may have an (AB)$_n$ X structure, wherein X is a multi-valent linking agent. Block copolymers of these types are well-known. Details concerning their preparation, structure, and properties may be found, for example, in the following references: "Styrene-Diene Block Copolymers" *Encyclopedia of Polymer Science and Technology* 1st Ed., Suppl., Wiley, pp 508–530(1971), K. E. Snavely et al, *Rubber World* 169, 45(1973), and "Thermoplastic Elastomers" *Kirk-Othmer Encyclopedia of Chemical Technology* 3rd., Vol. 8, Wiley-Interscience, pp 627–632(1981).

The following U.S. patents, incorporated herein by reference, further describe such block copolymer conjugated diene rubbers: U.S. Pat. Nos. 3,937,760, 3,231,635, 3,265,765, 3,198,774, 3,078,254, 3,244,644, 3,280,084, 3,954,452, 3,766,301, 3,281,383, 4,640,968, 4,503,188, 4,485,210, 4,390,663, 4,271,661, and 4,346,193. Suitable block copolymers are also presently available from commercial sources. Examples of commercially available block copolymer rubbers include Stereon ® 840A (a linear graded styrene/butadiene multi-block copolymer containing about 43% styrene and having a number average molecular weight of about 60,000, sold by Firestone Synthetic Rubber and Latex Co.), Stereon ® 730A (a stereospecific tapered styrene/butadiene block copolymer containing a total of 30% styrene with 21% styrene in block form and having a number average molecular weight of 140,000, sold by Firestone Synthetic Rubber and Latex Company), Kraton ® D-1101 (a linear styrene/butadiene/styrene triblock copolymer containing 31% styrene, sold by Shell Chemical), Kratone ® D-1107 (a linear styrene/isoprene/styrene triblock copolymer containing 14% styrene, sold by Shell Chemical), and Kraton ® D-1184 (a branched styrene/butadiene multi-block copolymer containing 30% styrene, sold by Shell Chemical).

Also suitable for use as conjugated diene rubbers in the rubber-modified styrenic resin component of this invention are random copolymers of mono-vinyl aromatic monomers and conjugated dienes. A particularly preferred conjugated diene rubber of this type is styrene/butadiene rubber (SBR). Homopolymers of conjugated dienes such as polybutadiene and polyisoprene may also be employed as the grafted rubber. All such rubbers are well-known in the art and are described, for example, in "Butadiene Polymers" *Encyclopedia of Polymer Science and Engineering* 2nd Ed., Wiley-Interscience, Vol. 2, pp. 537–590(1988), the teachings of which are incorporated by reference herein in their entirety.

The grafted rubber may alternatively be an ethylene propylene diene monomer (EPDM) rubber. Such materials are well-known in the art and are random copolymers of ethylene, at least one $C_3$–$C_6$ α-olefin (preferably propylene), and at least one nonconjugated diene. The nonconjugated diene may be a linear aliphatic diene of at least six carbon atoms which has either two terminal double bonds or one terminal double bond and one internal double bond. Alternatively, the nonconjugated diene may be a cyclic diene where one or both of the double bonds are part of a carbocyclic ring. The structure of the EPDM rubber may be altered as desired, particularly with respect to branching, by the selection of particular nonconjugated dienes as is well known in the art. Particularly preferred non-conjugated dienes include 1,4-hexadiene, dicyclopentadiene, vinyl norbornene, norbornadiene, and 5-ethylidene-2-norbornene. Preferably, the EPDM rubber contains from about 40 to 90 mole percent ethylene and 0.1 to 7.5 mole percent nonconjugated diene, with the remainder being propylene. Additional information regarding EPDM rubbers may be found in "Ethylene-Propylene Elastomers" *Encyclopedia of Polymer Science and Engineering* 2nd Ed., Wiley-Interscience, Vol. 6, p. 522(1986), the teachings of which are incorporated herein by reference.'

Examples of suitable commercially available EPDM rubbers include Royalene ® 501 (a product of Uniroyal Chemical), Nordel ® 2744 (a product of E. I. duPont de Nemours), and Epsyn ® 40-A (a product of Copolymer Rubber and Chemical Corp.). Functionalized EPDM rubbers, including rubbers having pendant hydroxy, amido, amino, or thio groups, may also be employed.

It is important that the rubber component of the styrenic resin be chemically grafted onto the random thermoplastic copolymer and not simply physically mixed with the copolymer. The exceptionally high impact properties of the polyblends of this invention cannot be realized by merely blending the rubber with the random vinyl aromatic monomer/α,β-carboxylic acid derivative copolymers.

Any suitable procedure for preparing the rubber-modified styrenic resin may be employed. For example, the vinyl aromatic monomer, α,β-unsaturated dicarboxylic acid derivative, and other ethylenically unsaturated monomer (if any) may be copolymerized in the presence of the rubber in such a manner as to result in grafting of the rubber onto the resulting random thermoplastic copolymer. This approach is illustrated in U.S. Pat. Nos. 3,919,354 and 4,097,551, the teachings of which are incorporated herein by reference. The rubber is first dissolved in the vinyl aromatic monomer before free radical polymerization is initiated. The α,β-unsaturated carboxylic acid derivative is then added continuously to the polymerizing mixture at a rate sufficient to maintain a low concentration of the α,β-unsaturated dicarboxylic acid derivative. Methods for preparing rubber-modified terpolymers of vinyl aromatic monomers, unsaturated dicarboxylic acid anhydrides, and unsaturated nitriles are described in U.S. Pat. No. 4,223,096, incorporated herein by reference. Other methods may also be employed, including reactive blending of the rubber with a pre-formed copolymer. Functional groups such as hydroxy, amido, amino, or thio may be present on the rubber to promote grafting with the random thermoplastic copolymers. Such methods are described, for example, in U.S. Pat. Nos. 4,721,752 and 4,742,116, incorporated herein by reference.

Especially preferred for use as the rubber-modified styrenic resins in the polyblends of this invention are resins in which the random thermoplastic copolymer is a styrene/maleic anhydride copolymer and the rubber is a styrene/butadiene block copolymer. Suitable commercially available rubber-modified styrenic resins include Dylark ® 250, Dylark ® 350, Dylark ® 378, and Dylark ® 700 (all products of ARCO Chemical Company).

C. Compatibilizer

The moldable polyblends of this invention are additionally comprised of from about 3 to 40 weight percent of a compatibilizer selected from the group consisting of mono-vinyl aromatic monomer/conjugated diene block copolymers, hydrogenated mono-vinyl aromatic monomer/conjugated diene block copolymers, and mixtures thereof. More preferably, the amount of compatibilizer is from about 3 to 30 weight percent of the total polyblend.

The mono-vinyl aromatic monomer may be one or more compounds containing a vinyl functional group attached directly to an aromatic ring. Exemplary mono-vinyl aromatic monomers are styrene (the preferred such monomer), ar-alkyl styrenes such as p-methyl styrene, p-tert-butyl styrene, and o,p-dimethyl styrene, ar-halo styrenes such as o-chloro styrene and o,p-dichloro styrene, vinyl benzyl chloride, vinyl naphthalene, and alphamethyl styrene and the like and mixtures thereof Although the preferred conjugated diene is 1,3-butadiene, other such compounds as chloroprene, isoprene, 2,3-dimethyl butadiene, 1,3-pentadiene, and the like and their mixtures may also be employed.

Compatibilizers suitable for use in this invention will contain at least one "soft" rubbery B block comprised predominantly of repeating units of one or more conjugated dienes (or their hydrogenated derivatives) and at least one "hard" thermoplastic A block comprised predominantly of repeating units of one or more mono-vinyl aromatic monomers. The "soft" block has a glass transition temperature below about 0° C.; more preferably, the Tg is less than about −20° C. The compatibilizer may have a linear, branched, or radial structure. Linear compatibilizers can have an ABA, AB(AB)$_n$A, (AB)$_n$, or similar structure where n is an integer from 1 to 10. Radial compatibilizers may have an (AB)$_n$ X structure, wherein X is a multi-valent linking agent. In a preferred embodiment, the compatibilizer has a linear triblock structure and is a styrene/butadiene or hydrogenated styrene/butadiene block copolymer. The amount of styrene in such compatibilizers preferably varies from about 10 to 60 weight percent and the overall molecular weight is preferably in the range of from about 35,000 to 300,000.

Block copolymers suitable for use as compatibilizers in the polyblends of this invention are well-known. Such materials are described, for example, in "Styrene-Diene Block Copolymers" *Encyclopedia of Polymer Science and Technology* 1st Ed., Suppl., Wiley, pp. 508–570(1971), K. E. Snavely et al *Rubber World* 169, 45(1973), and "Thermoplastic Elastomers" *Kirk-Othmer Encyclopedia of Chemical Technology* 3rd Ed., Vol. 8, Wiley-Interscience, pp. 627–632(1981).

The following exemplary U.S. patents, incorporated herein by reference, describe the preparation and properties of suitable mono-vinyl aromatic monomer/conjugated diene block copolymers useful as compatibilizers: U.S. Pat. Nos. 3,265,765, 3,937,760, 3,251,905, 3,287,333, 3,281,383, 3,692,874, 4,346,193, 4,371,661, 4,390,663, 4,485,210, 4,503,188, 4,640,968, 3,078,254, 3,778,490, 3,639,521, 3,903,201, 3,149,182, 3,231,635, 3,390,207, 3,567,798, 3,594,452, 3,639,523, and 3,890,408.

Compatibilizers which are hydrogenated mono-vinyl aromatic monomer/conjugated diene block copolymers may be obtained by the methods given in the following U.S. patents, incorporated herein by reference: U.S. Pat. Nos. 3,595,942, 3,700,633, 3,333,024, 3,706,817, 3,415,759, 3,507,934, 3,644,588, 3,670,054, 3,700,748, 3,792,005, 3,792,127, and U.S. Re. 27,145.

Commercially available block copolymers may also be used as polyblend compatibilizers, including, for example, Kraton ® G-1652 (a linear hydrogenated styrene/butadiene triblock copolymer containing 29% styrene, sold by Shell Chemical), Kraton ® G-1657X (a linear hydrogenated styrene/butadiene triblock copolymer containing 13% styrene and 35% diblock copolymer, sold by Shell Chemical), SOL T-168 (a radial styrene/butadiene block copolymer containing 43% styrene, sold by Enichem), and SOL T-192 (a styrene/isoprene block copolymer containing 25% styrene, sold by Enichem).

D. Method of Preparing Polyblend

The blending of the olefin polymer, rubber-modified styrenic resin, and compatibilizer may be performed in any manner that produces a compatibilized polyblend. The resulting compatibilized polyblend is dimensionally stable and does not exhibit delamination upon molding and in subsequent use. One method is to dissolve the polyblend components in a common solvent and then precipitate the polyblend by combining the solution with a non-solvent in which none of the components are soluble. However, the preferred procedure is to intimately mix the components in the form of granules and/or powder in a high shear mixer at an elevated temperature. Intimate mixing may be accomplished by the use of high shear extrusion compounding machines such as single or twin screw compounding extruders or thermoplastic extruders having preferably at least a 20:1 L/D ratio and a compression ratio of about 3 or 4:1. The polyblend may be either supplied directly to a molding machine or converted into pellet form for further processing.

The mixing temperature is selected in accordance with the particular components to be blended. For example, generally it will be desirable to select a melt blending temperature above the melting or softening point of the component having the highest melting or softening point, but below the temperature at which thermal degradation of any component becomes significant. Blending temperatures between about 190° C. and 300° C. are generally suitable.

The order of blending is not critical. For example, all the components of the polyblend may be combined in a single step or, alternatively, the compatibilizer may be pre-blended with the olefin polymer. In yet another variation, a portion of the compatibilizer may be pre-blended with the olefin polymer and the remainder added when preparing the final polyblend. Other such variations will be apparent to one skilled in the art.

The moldable polyblends of this invention may be combined with any of the standard thermoplastic additives such as fillers, reinforcing agents, colorants, lubricants, anti-static agents, stabilizers, fire retardants, antioxidants, anti-blocking agents, and/or other compounding ingredients.

Examples of fillers which may be blended with the polyblends of this invention include, but are not limited to, mineral fillers such as calcium carbonate, dolomite, silicates, silicas, talc, kaolin, mica, magnesium phosphate, barium sulfate, titanium oxide, and the like, organic fillers such as carbon black, and fibrous fillers such as glass fiber (including strands and chopped fiber), carbon fiber, graphite fiber, aromatic polyamide fiber, ceramic fiber, and boron fiber. The weight ratio of polyblend to filler is preferably from about 0.5:1 to 20:1.

From the foregoing description, one skilled in the art can readily ascertain the essential characteristics of this invention, and, without departing from the spirit and scope thereof, can make various changes and modifications of the invention to adapt it to various usages, conditions, and embodiments.

The following examples further illustrate the moldable polyblends of this invention, but are not limitative of the invention in any manner whatsoever.

EXAMPLES

A. Description of Polyblend Components

Olefin polymer A-1 is a 75:25 blend of Escorene ® 1042 polypropylene (a propylene homopolymer having a melt flow rate of 1.9 g/10 min., sold by Exxon Chemical) and IM-7565 impact modifier [a 2:1 blend of EPDM (containing a 1:1 ratio of ethylene to propylene) and HDPE (high density polyethylene), sold by Uniroyal Chemical Company].

Olefin polymer A-2 is an 85:15 blend of Escorene ® 1042 polypropylene and IM-7565 impact modifier.

Olefin polymer A-3 is Escorene ® 1042.

Olefin polymer A-4 is Marlex ® HGH-050, a propylene homopolymer having a melt flow rate of 5.0 g/10 min., sold by Phillips.

Olefin polymer A-5 is Tenite ® P64MZ-007, a propylene copolymer having a melt flow rate of 8.0 g/10 min., sold by Eastman.

Olefin polymer A-6 is Fina ® 3662, a propylene homopolymer having a melt flow rate of 12 g/10 min., sold by Fina Oil.

Olefin polymer A-7, is Norchem ® NPP8404HJ, a propylene copolymer having a melt flow rate of 3, sold by Quintum Chemical Corp.

Styrenic resin B-1 is a styrene/maleic anhydride random copolymer containing about 14 weight percent maleic anhydride but no grafted rubber. B-1 has a melt flow rate of about 1.6 g/10 min. (Condition L).

Styrenic resin B-2 is a rubber-modified styrene/maleic anhydride random copolymer containing about 13 weight percent maleic anhydride and prepared in accordance with the procedures of U.S. Pat. No. 3,919,354. B-2 has a melt flow rate of about 1.0 g/10 min. (Condition L) and contains about 15 weight percent of a grafted styrene/butadiene block copolymer rubber.

Styrenic resin B-3 is a styrene/maleic anhydride random copolymer having a melt flow rate of about 1.5 g/10 min., and containing 10 weight percent maleic anhydride and 5 weight percent of Diene ® 35NF (a polybutadiene rubber having about 35% cis; 1,4-configuration, sold by Firestone Synthetic Rubber and Latex); prepared in accordance with U.S. Pat. No. 3,919,354.

Styrenic resin B-4 is a 50/20/15/5 styrene/p-methyl styrene/maleic anhydride/citraconic anhydride random copolymer containing about 20 weight percent of Krynac ® 34.50 (an acrylonitrile/butadiene rubber containing 34% acrylonitrile, sold by Polysar); prepared in accordance with U.S. Pat. No. 3,919,354.

Styrenic resin B-5 is a styrene/maleic anhydride random copolymer containing 20 weight percent maleic anhydride and 25 weight percent of Ameripole ® 4616 (a styrene/butadiene random copolymer rubber containing 23.5% styrene, sold by B. F. Goodrich); prepared in accordance with U.S. Pat. No 3,919,354.

Styrenic resin B-6 is a terpolymer containing 65 weight percent styrene, 24 weight percent maleic anhydride, and 11 weight percent acrylonitrile and grafted with 16 weight percent of a polybutadiene rubber; prepared in accordance with Example 5 of U.S. Pat. No. 4,223,096.

Compatibilizer C-1 is Kraton ® G-1652, a linear hydrogenated styrene/butadiene block copolymer containing 29% styrene (sold by Shell Chemical Company).

Compatibilizer C-2 is Sol ® T-166, a styrene/butadiene block copolymer containing about 30% styrene and having a number average molecular weight of about 80,000 (sold by Enichem).

Compatibilizer C-3 is a star block copolymer containing 40% styrene prepared in accordance with Example IV-3 of U.S. Pat. No. 3,281,383.

Compatibilizer C-4 is Kraton ® D-1111, a linear styrene/isoprene block copolymer containing 21% styrene sold by Shell Chemical.

Compatibilizer C-5 is Kraton ® D-1184, a branched styrene/butadiene multi-block copolymer containing 30% styrene sold by Shell Chemical.

Compatibilizer C-6 is a linear styrene/butadiene block copolymer having a calculated average of 5.3 blocks and a 1:3.4 weight ratio of styrene:butadiene, prepared according to Example I of U.S. Pat. No. 3,937,760.

B. Blending Procedure

Polyblends were prepared by melt-blending the components shown in Table I using an Egan 1.5" single screw/single vent extruder (L/D=24:1) and the following conditions:

| RPM: 165 | |
|---|---|
| Vacuum: 50 torr | |
| Screw Type: Stratablend screw | |
| Hopper Throat: Water-cooled | |
| Zone Temp. (°F.): | |
| 1 | 470 |
| 2 | 470 |
| 3 | 470 |
| 4 | 470 |
| Die | 470 |

In Examples 10–12, olefin polymer A-3 was preblended with approximately one-third of the compatibilizer in a first step, then blended with the styrenic resin and the remainder of the compatibilizer in a second step.

Molded samples for testing of physical properties were obtained by injection molding using a Reed 5 oz. 100 ton injection molding machine and the following conditions:

| Zone 1 | 470 F |
|---|---|
| Zone 2 | 470 F |
| Zone 3 | 470 F |
| Nozzle | 465 F |
| Inj. Pressure | 650 psi |
| Hold Pressure | 450 psi |
| Back Pressure | 100 psi |
| Mold Close Time | 45 sec |

-continued

| | | |
|---|---|---|
| Mold Temp. | 120 | F |
| Screw Speed | 60 | rpm |
| Inj. Forward Setting | 8 | sec |
| Mold Open | 8 | sec |
| Mold Close | 45 | sec |
| Cushion | ¼ | inches |
| Shot Size | 4¼ | inches |
| Melt Temp. | 480 | F |

The physical properties of the molded samples were measured using standard ASTM methods (Table I).

To illustrate the use of differing proportions of various olefin polymers, rubber-modified styrenic resins, and compatibilizers within the scope of this invention, polyblends having the compositions shown in Table II (Examples 16–19) are prepared using the procedures described for Examples 1–12. The polyblends are expected to exhibit the beneficial impact properties attainable by this invention when molded into thermoplastic articles.

TABLE II-continued

| EXAMPLE NO. | 16 | 17 | 18 | 19 |
|---|---|---|---|---|
| Styrenic Resin | B-3 | B-4 | B-5 | B-6 |
| Wt. % | 10 | 25 | 35 | 15 |
| Compatibilizer | C-3 | C-4 | C-5 | C-6 |
| Wt. % | 10 | 20 | 5 | 15 |

C. Discussion

The polyblends of Examples 2 and 4, containing rubber-modified styrene/maleic anhydride random thermoplastic copolymers in accordance with this invention, exhibited a two to three-fold increase in notched Izod and penetration impact strength as compared to the polyblends of Comparative Examples 1 and 3, which contained styrene/maleic anhydride copolymer having no grafted rubber. This significant reduction in brittleness was achieved with only a minor increase in the total amount of rubber in the polyblends. The compatibilizer used in these examples was a linear hydrogenated styrene/butadiene block copolymer.

In Examples 5 and 6, a styrene/butadiene block copolymer containing 30% styrene was used as the compatibilizer. Once again, the substitution of a rubber-modified styrenic resin for an ungrafted random co-

TABLE I

| EXAMPLE NO. | 1* | 2 | 3* | 4 | 5* | 6 |
|---|---|---|---|---|---|---|
| Composition | | | | | | |
| A. Olefin Polymer | A-1 | A-1 | A-1 | A-1 | A-1 | A-1 |
| Wt. % | 75 | 75 | 70 | 70 | 70 | 70 |
| B. Styrenic Resin | B-1 | B-2 | B-1 | B-2 | B-1 | B-2 |
| Rubber-Modified | No | Yes | No | Yes | No | Yes |
| Wt. % | 20 | 20 | 20 | 20 | 20 | 20 |
| C. Compatibilizer | C-1 | C-1 | C-1 | C-1 | C-2 | C-2 |
| Wt. % | 5 | 5 | 10 | 10 | 10 | 10 |
| % Total Rubber[1] | 17.6 | 20.6 | 21.7 | 24.7 | 21.7 | 24.7 |
| % Grafted Rubber[2] | 0 | 3 | 0 | 3 | 0 | 3 |
| Properties | | | | | | |
| Notched Izod (ft-lbs/in) | 2.2 | 6.3 | 5.4 | 10.2 | 2.2 | 8.3 |
| Penetration Impact | | | | | | |
| Total Energy (ft-lbs) | 7.1 | 23.3 | 10.6 | 27.9 | 8.8 | 25.3 |
| Max. Load (lbs) | 330 | 440 | 370 | 510 | 310 | 500 |
| Tensile Strength @ Yield (psi) | 3800 | 3300 | 3450 | 3100 | 3400 | 3100 |
| Elongation @ Break (%, 2"/min) | >150 | >150 | 133 | >150 | 33 | 80 |
| Flex. Strength @ Yield (psi) | 6250 | 5200 | 5600 | 4600 | 5600 | 4900 |
| Flex. Modulus (psi × 1000) | 166 | 145 | 150 | 130 | 154 | 137 |
| DTUL (°F., 264/66 psi) | 140/219 | 129/196 | 140/211 | 128/196 | 129/209 | 120/204 |

| EXAMPLE NO. | 7* | 8 | 9 | 10* | 11* | 12 | 13* | 14* | 15* |
|---|---|---|---|---|---|---|---|---|---|
| Composition | | | | | | | | | |
| A. Olefin Polymer | A-2 | A-2 | A-2 | A-3 | A-3 | A-3 | — | A-1 | A-3 |
| Wt. % | 60 | 65 | 65 | 49 | 49 | 49 | — | 100 | 100 |
| B. Styrenic Resin | B-1 | B-2 | B-2 | B-1 | B-1 | B-2 | B-2 | — | — |
| Rubber-Modified | No | Yes | Yes | No | No | Yes | Yes | — | — |
| Wt. % | 20 | 20 | 20 | 20 | 20 | 20 | 100 | — | — |
| C. Compatibilizer | C-2 | C-2 | C-1 | C-2 | C-1/C-2 | C-2 | — | — | — |
| Wt. % | 20 | 15 | 15 | 31 | 10/21 | 31 | — | — | — |
| % Total Rubber[1] | 26 | 24.5 | 24.5 | 31 | 31 | 34 | 15 | 16.8 | 0 |
| % Grafted Rubber[2] | 0 | 3 | 3 | 0 | 0 | 3 | 15 | 0 | 0 |
| Properties | | | | | | | | | |
| Notched Izod (ft-lbs/in) | 2.6 | 6.6 | 13.1 | 2.6 | 3.1 | 10.6 | 2.7 | 13.8 | 0.8 |
| Penetration Impact | | | | | | | | | |
| Total Energy (ft-lbs) | 6.8 | 27.0 | 30.3 | 9.3 | 5.7 | 26.3 | 11 | 22.0 | 3.0 |
| Max. Load (lbs) | 270 | 535 | 575 | 380 | 330 | 495 | | | |
| Tensile Strength @ Yield (psi) | 3300 | 3300 | 3200 | 3300 | 3400 | 3400 | 4700 | | 5000 |
| Elongation @ Break (%, 2"/min) | 45 | >150 | >150 | 55 | >150 | >150 | | | |
| Flex. Strength @ Yield (psi) | 5400 | 5200 | 5200 | 5400 | 5300 | 4800 | 10,000 | | |
| Flex. Modulus (psi × 1000) | 143 | 142 | 138 | 144 | 137 | 127 | 366 | | |
| DTUL (°F., 264/66 psi) | 133/216 | 120/206 | 120/201 | 130/208 | 126/213 | 121/206 | 207/230 | 117/175 | 131/2 |

Notes:
*Comparative example
[1] % Total rubber [impact modifier (EPDM) in olefin polymer + grafted rubber in styrenic resin + compatibilizer] in final polyblend composition
[2] % Grafted rubber from styrenic resin in final polyblend composition

TABLE II

| EXAMPLE NO. | 16 | 17 | 18 | 19 |
|---|---|---|---|---|
| Olefin Polymer | A-4 | A-5 | A-6 | A-7 |
| Wt. % | 80 | 55 | 60 | 70 | polymer resulted in an unanticipated improvement in impact properties. Both notched Izod and penetration impact strength increased at least about three-fold despite only increasing the total amount of rubber from 21.7 to 24.7 percent of the polyblend. In view of the gains in impact properties realized, it was surprising that the heat resistance of the polyblend of Example 6 was comparable to that of the polyblend of Comparative Example 5.

The benefits and advantages of the present invention are further illustrated by comparison of the physical properties obtained for the polyblends of Examples 8 and 9 to those of the Example 7 polyblend. In Comparative Example 7, an impact-modified polypropylene was blended with a styrene/maleic anhydride copolymer containing no grafted rubber. The impact strength of the resulting polyblend was relatively poor (2.6 notched Izod). In Example 8, however, the use of a rubber-modified styrene/maleic anhydride copolymer resin of similar anhydride content and molecular weight led to a very substantial gain in impact properties. This was unexpected in view of the overall reduction in the total amount of rubber in the polyblend of Example 8 as compared to that of Example 7 (24.5 vs. 26%). Moreover, there was no significant reduction in tensile strength, flexural strength, flexural modulus, or heat distortion resistance despite the greatly reduced brittleness of the polyblend of Example 8. Thus, the polyblends of this invention have an outstanding overall balance of properties not realized by prior art compositions. The remarkable benefits of using a rubber-modified styrenic resin are even more surprising in light of the relatively low impact strength of the styrenic resin itself (Example 13).

Still further improvements in impact properties were realized in the polyblend of Example 9 by the use of a hydrogenated styrene/butadiene block copolymer compatibilizer in place of the non-hydrogenated styrene/butadiene block copolymer of Example 8. Once again, the other physical properties of the polyblend were not detrimentally affected.

The polyblends of Comparative Example 10 and Example 12 differ only in the use of a rubber-modified styrene/maleic anhydride copolymer as the styrenic resin component in Example 12. This substitution, which only increased the total amount of rubber in the polyblend from 31 to 34, led to a four-fold increase in the notched Izod impact resistance.

I claim:
1. A moldable polyblend composition comprising:
   (a) from about 40 to 80 weight percent of an olefin polymer, wherein the olefin polymer has a melt flow rate of less than 15 g/10 minutes and at least about 50 weight percent of the olefin polymer is a crystalline propylene polymer;
   (b) from about 5 to 40 weight percent of a rubber-modified styrenic resin comprised of from about 65 to 95 weight percent of a random thermoplastic copolymer of
      (i) from about 35 to 99 weight percent of a vinyl aromatic monomer;
      (ii) from about 1 to 30 weight percent of an $\alpha,\beta$-unsaturated dicarboxylic acid derivative; and
      (iii) from 0 to about 35 weight percent of an ethylenically unsaturated monomer selected from the group consisting of unsaturated nitriles, $\alpha,\beta$-unsaturated mono-carboxylic acids, $C_1$-$C_4$ alkyl esters of $\alpha,\beta$-unsaturated mono-carboxylic acids, and their mixtures;
   and from about 5 to 35 weight percent of a rubber selected from the group consisting of conjugated diene rubbers and ethylene propylene diene monomer rubbers, wherein said rubber is grafted with the random thermoplastic copolymer; and
   (c) from about 3 to 40 weight percent of a compatibilizer selected from the group consisting of monocinyl aromatic monomer/conjugated diene block copolymers, hydrogenated mono-vinyl aromatic monomer/conjugated diene block copolymers, and mixtures thereof.

2. The polyblend composition of claim 1 wherein the random thermoplastic copolymer is a copolymer of from about 70 to 99 weight percent of the vinyl aromatic monomer and from about 1 to 30 weight percent of the $\alpha,\beta$-unsaturated dicarboxylic acid derivative.

3. The polyblend composition of claim 1 wherein the olefin polymer is a blend of from about 60 to 92.5 weight percent crystalline propylene polymer, from about 5 to 27 weight percent of an ethylene propylene diene monomer rubber, and from about 2.5 to 13 weight percent high density polyethylene.

4. The polyblend composition of claim 1 wherein the olefin polymer is crystalline polypropylene.

5. The polyblend composition of claim 1 wherein the vinyl aromatic monomer of the random thermoplastic copolymer is styrene.

6. The polyblend composition of claim 1 wherein the $\alpha,\beta$-unsaturated dicarboxylic acid derivative of the random thermoplastic copolymer is maleic anhydride.

7. The polyblend composition of claim 1 wherein the random thermoplastic copolymer is a random thermoplastic copolymer of styrene and maleic anhydride.

8. The polyblend composition of claim 1 wherein the rubber is a styrene/butadiene block copolymer.

9. The polyblend composition of claim 1 wherein the compatibilizer is a styrene/butadiene block copolymer.

10. The polyblend composition of claim 1 wherein the compatibilizer is a hydrogenated styrene/butadiene block copolymer.

11. A moldable polyblend composition comprising:
   (a) from about 45 to 80 weight percent of an olefin polymer, wherein the olefin polymer has a melt flow rate of less than 12 g/10 minutes and at least about 60 weight percent of the olefin polymer is a crystalline propylene polymer;
   (b) from about 10 to 30 weight percent of a rubber-modified styrenic resin comprised of from about 75 to 90 weight percent of a random thermoplastic copolymer of
      (i) from about 75 to 95 weight percent of styrene; and
      (ii) from about 5 to 25 weight percent of maleic anhydride;
   and from about 10 to 25 weight percent of a monovinyl aromatic monomer/conjugated diene block copolymer rubber, wherein said rubber is grafted with said random thermoplastic copolymer and contains at least about 50 weight percent conjugated diene; and
   (c) from about 3 to 30 weight percent of a compatibilizer selected from the group consisting of styrene/butadiene block copolymers and hydrogenated styrene/butadiene block copolymers.

12. The polyblend composition of claim 11 wherein the olefin polymer is a blend of from about 60 to 92.5 weight percent crystalline polypropylene, from about 5 to 27 weight percent ethylene propylene diene rubber, and from about 2.5 to 13 weight percent high density polyethylene.

13. The polyblend composition of claim 11 wherein the olefin polymer is crystalline polypropylene.

14. The polyblend composition of claim 11 wherein the block copolymer rubber is a styrene/butadiene block copolymer.

15. The polyblend composition of claim 11 wherein the compatibilizer is a hydrogenated styrene/butadiene block copolymer having a linear triblock structure and containing from about 10 to 60 weight percent styrene and from about 40 to 90 weight percent butadiene.

16. A filled thermoplastic composition comprising the polyblend composition of claim 1, and a filler in a polyblend composition filler weight ratio of from about 0.5:1 to 20:1.

17. A filled thermoplastic composition comprising the polyblend composition of claim 11 and a filler in a polyblend composition filler weight ratio of from about 0.5:1 to 20:1.

* * * * *

UNITED STATES PATENT AND TRADEMARK OFFICE
CERTIFICATE OF CORRECTION

PATENT NO.   : 5,034,449
DATED        : July 23, 1991
INVENTOR(S)  : Ramesh Mallikarjun It is certified that error appears in the above—identified patent and that said Letters Patent is hereby corrected as shown below:

Claim 1 (col. 14, line 10), delete "cinyl", insert --vinyl--.

Signed and Sealed this

Twenty-second Day of December, 1992

*Attest:*

DOUGLAS B. COMER

*Attesting Officer*     Acting Commissioner of Patents and Trademarks